United States Patent
Stoneback et al.

(10) Patent No.: US 8,978,085 B2
(45) Date of Patent: Mar. 10, 2015

(54) RETURN DATA PATH IN AN HFC NETWORK

(75) Inventors: Dean A. Stoneback, Souderton, PA (US); Steven F. Frederick, Jamison, PA (US); Gary A. Picard, Carlisle, MA (US)

(73) Assignee: General Instrument Corporation, Horsham, PA (US)

( * ) Notice: Subject to any disclaimer, the term of this patent is extended or adjusted under 35 U.S.C. 154(b) by 1651 days.

(21) Appl. No.: 11/616,951

(22) Filed: Dec. 28, 2006

(65) Prior Publication Data
US 2012/0198510 A1  Aug. 2, 2012

(51) Int. Cl.
H04N 7/173 (2011.01)
H04B 10/2575 (2013.01)
H04N 21/437 (2011.01)
H04N 7/22 (2006.01)

(52) U.S. Cl.
CPC ....... H04B 10/25751 (2013.01); H04N 21/437 (2013.01); H04N 7/22 (2013.01)
USPC ............................ 725/111; 725/118; 725/121

(58) Field of Classification Search
None
See application file for complete search history.

(56) References Cited

U.S. PATENT DOCUMENTS

| | | |
|---|---|---|
| 5,138,440 A | 8/1992 | Radice |
| 5,854,703 A | 12/1998 | West, Jr. |
| 6,134,035 A | 10/2000 | Krimmel |
| 2001/0055319 A1* | 12/2001 | Quigley et al. ............... 370/480 |
| 2003/0028897 A1 | 2/2003 | Brooks |
| 2003/0194241 A1* | 10/2003 | Farmer ...................... 398/167.5 |
| 2005/0022247 A1* | 1/2005 | Bitran et al. .................. 725/111 |
| 2008/0056713 A1* | 3/2008 | Cooper et al. .................. 398/38 |

FOREIGN PATENT DOCUMENTS

| | | | |
|---|---|---|---|
| EP | 840470 A2 | 5/1998 | |
| WO | 0195626 A2 | 12/2001 | |

OTHER PUBLICATIONS

Canadian Intellectual Property Office, "Official Action—Rejection" for Canadian Application No. 2,609,168 Aug. 12, 2011, 2 pages.
Office Action mailed on Sep. 5, 2011 in Mexican Patent Application MX/a/2007/016142.
Office Action mailed on Mar. 1, 2012 in Mexican Patent Application MX/a/2007/016142.
Office Action mailed on Mar. 21, 2012 in Canadian Patent Application CA2609168.
Office Action mailed on Dec. 5, 2012 in Canadian Patent Application CA2609168.
Notice of Allowance mailed on Aug. 8, 2013 in Canadian Patent Application CA2609168.

* cited by examiner

Primary Examiner — Brian T Pendleton
Assistant Examiner — Jean D Saint Cyr
(74) Attorney, Agent, or Firm — Lori Anne D. Swanson

(57) ABSTRACT

Described herein are devices and methods for facilitating the transmission of an upstream data signal from at least one subscriber in a communications network. The device is operable to receive a radio frequency (RF) signal from one or more subscribers. The RF signal includes at least one upstream data signal. The RF signal is demodulated into the upstream data signal by a RF demodulator in the device, which is then converted into an optical signal by an optical transducer in the device for transmission over a fiber optic link in the network.

13 Claims, 7 Drawing Sheets

RETURN DATA PATH IN AN HFC NETWORK

BACKGROUND

The majority of modern cable telecommunications systems used today are built with a Hybrid Fiber Coax (HFC) network topology. This topology uses fiber optic cable to transmit optical signals to and from a fiber optic node located near a cable subscriber, such as a residential home, subscribing to cable telecommunication services. The fiber optic node receives and converts the optical signals into Radio Frequency (RF) signals. These RF signals are then transmitted from the fiber optic node to the subscriber's home over a coaxial cable.

FIG. 1 illustrates a conventional HFC network 100. The HFC network 100 includes a head-end 102. The head-end 102 is a facility for receiving, processing, and distributing media signals, including video, audio, and data signals, over the HFC network 100. The head-end 102 is typically maintained or managed by a media service provider, such as a cable television (CATV) provider or an Internet service provider (ISP). The head-end 102 may include any reasonably suitable electrical equipment for receiving, storing, and re-transmitting media signals, such as media servers, satellite receivers, modulators/demodulators, edge decoders, etc. The head-end 102 may transmit the media signals downstream to subscribers 110, over a fiber optic link 104 to one or more fiber optic nodes 106, each supporting any number of subscribers 110, depicted here as residential homes. While, the subscribers 110 may include a plurality of individual residential homes or premises, a person having ordinary skill in the art will appreciate that the subscribers 110 may, of course, include multi-unit dwellings and commercial premises that subscribe to media content services. Each fiber optic node 106 receives and converts the optical signals sent from the head-end 102 into RF signals, which are then delivered to the subscribers 110, via coaxial cables 108.

Conventional HFC networks, such as the network 100, typically employ various methods or sending desired signals over a coaxial cable, such as the coaxial cables 108. One common method is data over cable service interface specification (DOCSIS), which is an international standard that defines the communications and operation support interface requirement for a data-over-cable system. DOCSIS permits the addition of high speed data transfer to an existing cable TV system and is employed by the majority of multiple-service operators (MSOs) to provide Internet, real-time interactive gaming, video conferencing, video on-demand services, etc. over existing HFC networks. DOCSIS includes two primary components: at least one piece of subscriber equipment, such as a cable modem and/or a multimedia terminal adapter (MTA), located at a subscriber's premises and a cable modem termination system (CMTS) located at the head-end 102. In the upstream data path, the subscriber equipment generates a data signal, which is transmitted for interpretation by the CMTS, as described in greater detail below.

In recent years, new housing developments have been built with fiber optic links (e.g., fiber optic cables) extending near, or directly to, the subscribers 110 and, in some cases, no longer provide coaxial cable links to the subscribers 110. These fiber-to-the-premises (FTTP) architectures operate essentially by moving the fiber optic node 106, depicted in FIG. 1, to each of the subscribers 110. Therefore, optical signals are delivered directly to each subscriber's premises. While the use of coaxial cable 108 is reduced, these modern architectures may still be considered HFC networks because they utilize coaxial cable within the subscriber's premises. However, MSOs do not currently have a cost effective technology to deliver their RF signals over fiber in FTTP architectures and are, therefore, at a competitive disadvantage in such circumstances. Furthermore, because of the very large investment MSOs have made in DOCSIS equipment for existing HFC networks, it is desirable for the MSOs to have a FTTP solution that can leverage such equipment.

One apparent solution is to place a fiber optic node at each subscriber 110. In such a solution, optical signals are delivered directly to each subscriber 110, such as a residential home, which are then converted by the fiber optic node 106 into RF signals for transmission through one or more coaxial cables to one or more pieces of subscriber equipment therein. This is conceptually simple for the downstream signals (signals sent down or downloaded from the head-end 102 to the subscribers 110) and is, in fact, being utilized by known passive optical network (PON) architectures with video overlays. Such a fiber optic node at the subscriber's premises is commonly called an optical network terminal (ONT).

With the increasing use of Internet and interactive television services, such as video on-demand, the previously seldom-used upstream signals have garnered increased attention. As understood in the art, upstream or return path signals, refer to data generated by the subscriber's equipment for transmission back to the head-end 102 or media service provider. Examples of common subscriber equipment, which generate upstream signals include, but are not limited to, set top boxes (STBs) used for cable television services, cable modems used for high-speed internet and e-mail services, and MTAs for voice over Internet protocol (VoIP) services. Thus, upstream signals may include data and control information from such devices. For example, a subscriber 110 may select a particular on-demand movie or television program. This selection is sent back to the head-end 102 so that the selected movie or television program may be provided to the subscriber 110. Typically, upstream data signals are sent from the subscribers 110 to the head-end 102 as digital signals modulated on analog RF carrier signals, which are produced by the subscriber equipments.

SUMMARY

Sending upstream signals from a subscriber 110 to the head-end 102 or hub is not as simple as sending downstream signals from the head-end 102 to the subscriber 110. With the deployment of a fiber optic node at each subscriber 110, the RF carrier signals are transmitted from the subscribers 110 over coaxial cables 108 to the fiber optic node 106. In turn, the fiber optic node 106 converts the analog RF carrier signals to analog optical signals for transmission to the head-end 102 via the fiber optic link 104. However, the deployment of a return-path laser for generating analog optical signals to be sent back to the head-end at each subscriber's premises is problematic for several reasons. First, these lasers are currently too expensive to be deployed at every subscriber 110. Also, analog optical signals from a large number of lasers cannot be directly combined into one optical fiber link without suffering from unacceptable carrier-to-noise degradation due to the quantity of the signals being combined. Yet, combining the signals from a smaller number of lasers would increase the quantity of fiber optic links and fiber optic receivers required, making the overall system too expensive for deployment. Furthermore, when two or more lasers are transmitting at the same time, care must be taken to ensure that no two lasers are producing optical carriers within several hundred MHz of each other. Otherwise, a total loss of data will result due to non-linear mixing of the two optical carriers. That is, because the difference-beat of the two wavelengths may produce a very large noise-like spectrum at the same frequencies as the desired signals, making reliable data transmission nearly impossible.

The problems associated with sending upstream signals have been previously addressed in a non-DOCSIS-compliant network. Specifically, a method of sending upstream signals over an Asynchronous Transfer Mode (ATM) PON has been developed. In this system, upstream data signals demodulated by optical network units (ONUs) at the end users, which are similar to the ONTs, are added directly into the upstream ATM frames for transmission to the head-end. As understood in the art, the PON topology is different than other optical network topologies in that it is a Point-to-Multi-Point (P2MP) topology. From the Central Office's (CO) Optical Line Terminal (OLT), which is equivalent to a terminal at the head-end 102 shown in FIG. 1, a single fiber link goes out to a passive optical splitter where the signal is split into multiple different lines to serve multiple premises or subscribers. The transmit and receive signals operate on different optical wavelengths to allow bi-directional operation over a single fiber link. When transmitting data in a PON, because all 32 lines are multiplexed to a single fiber link, only one ONU may transmit at a time. To solve this problem, each ONU is given a time slot where it can transmit a burst of data. The order of transmission is determined by the OLT. Thus, instead of the DOCSIS protocol used by HFC networks, PONs often utilize asynchronous transfer mode (ATM). ATM is a protocol which encodes data traffic into small bytes, called frames, and maintains a continuous connection between the OLT and the ONUs, periodically sending frames through the PON.

As noted earlier, it is conceptually simple to transmit downstream signals to the ONTs at the subscribers in a PON. Anything transmitted from the OLT is transmitted to all of the multiple lines. It is then up to the ONT at each subscriber, at the other end of each of the multiple lines, to determine what packets are for such a subscriber. All other packets are discarded. However, the timing and control of the upstream frames is accomplished by the PON protocol being used. Therefore, when an upstream data signal from a device inside the end user's premise is demodulated by an ONU at an end user's premise, the demodulated signal is inserted into the existing continuous connection between the OLT and the ONT. The upstream data signal frames are sent upstream during timeslots assigned by the OLT. While the aforementioned scheme operates effectively in PONs, it relies on ATM protocol and is not congruent with an existing HFC network that employs DOCSIS. Therefore, this system cannot be used with existing HFC networks, which make up the vast majority of MSO networks.

Accordingly, there exists a need for effectively and efficiently providing upstream data signals from the subscribers 110 to the head-ends 102 in a DOCSIS-compliant communications network, which may be an HFC network. Therefore, in one embodiment, there is provided a device for facilitating a transmission in a DOCSIS-compliant communications network of at least one upstream data signal from at least one subscriber to the DOCSIS-compliant communications network. The device may include an RF demodulator operable to receive an RF signal from the at least one subscriber, wherein the RF signal includes the at least one upstream data signal and demodulate the RF signal into the at least one upstream data signal. The device may also include an optical transducer operable to convert the at least one upstream data signal into an optical signal for transmission over a fiber optic link in the HFC network.

In another embodiment, there is provided a method for facilitating a transmission in an HFC network of at least one upstream data signal from at least one subscriber to the HFC network comprising: receiving at least one upstream radio frequency (RF) signal, wherein the RF signal includes the at least one upstream data signal; demodulating the at least one upstream RF signal into the at least one upstream data signal; converting the at least one upstream data signal as demodulated into at least one optical signal; and transmitting the at least one optical signal via a fiber optic link in the HFC network.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

For simplicity and illustrative purposes, the principles of the embodiments are described by referring mainly to examples thereof. In the following description, numerous specific details are set forth in order to provide a thorough understanding of the embodiments. It will be apparent however, to one of ordinary skill in the art, that the embodiments may be practiced without limitation to these specific details. In other instances, well known methods and structures have not been described in detail so as not to unnecessarily obscure the embodiments.

According to an embodiment, a method and device described herein facilitates the transmission of an upstream data signal in an HFC network. As described above, an upstream data signal refers to the return path data signal or a data signal generated at a subscriber and transmitted towards a head-end. For instance, a subscriber may select a video on-demand movie through an interactive cable television service provided to the subscriber. The selection of this movie may cause a piece of subscriber equipment, such as an STB, to generate a digital signal to be sent upstream to a head-end for processing, so that the user may receive the selected movie.

The transmission of the upstream data signal may be facilitated by a device, referred to herein as an optical network terminal (ONT). The ONT may be any hardware or combination of hardware and software capable of receiving a RF signal, demodulating the RF signal, and converting the demodulated signal into an optical transmission. The RF signal received by the ONT may include one or more RF bands in the RF spectrum, with the upstream data signal contained therein. The composite RF spectrum refers to the entire RF spectrum designated to return path signaling in HFC networks, which typically includes RF frequencies from about five megahertz (MHz) to about 42 MHz.

The ONT may receive the RF signal from the subscriber equipment via coaxial cable. However, instead of further transmitting this composite RF spectrum, the ONT described herein may select the upstream data signal from within the RF signal and demodulate the selected upstream data signal. Selecting the upstream data signal may involve the use of DOCSIS protocol to select a particular channel, or frequency range, from within the RF signal. For instance, the upstream data signal may include only one RF band of the RF spectrum ranging from 5 MHz to 7 MHz. This channel, or narrow frequency range, may be demodulated, by the ONT into the baseband digital signal originally generated by the subscriber equipment and further converted into an optical signal for upstream transmission.

Figure 1:
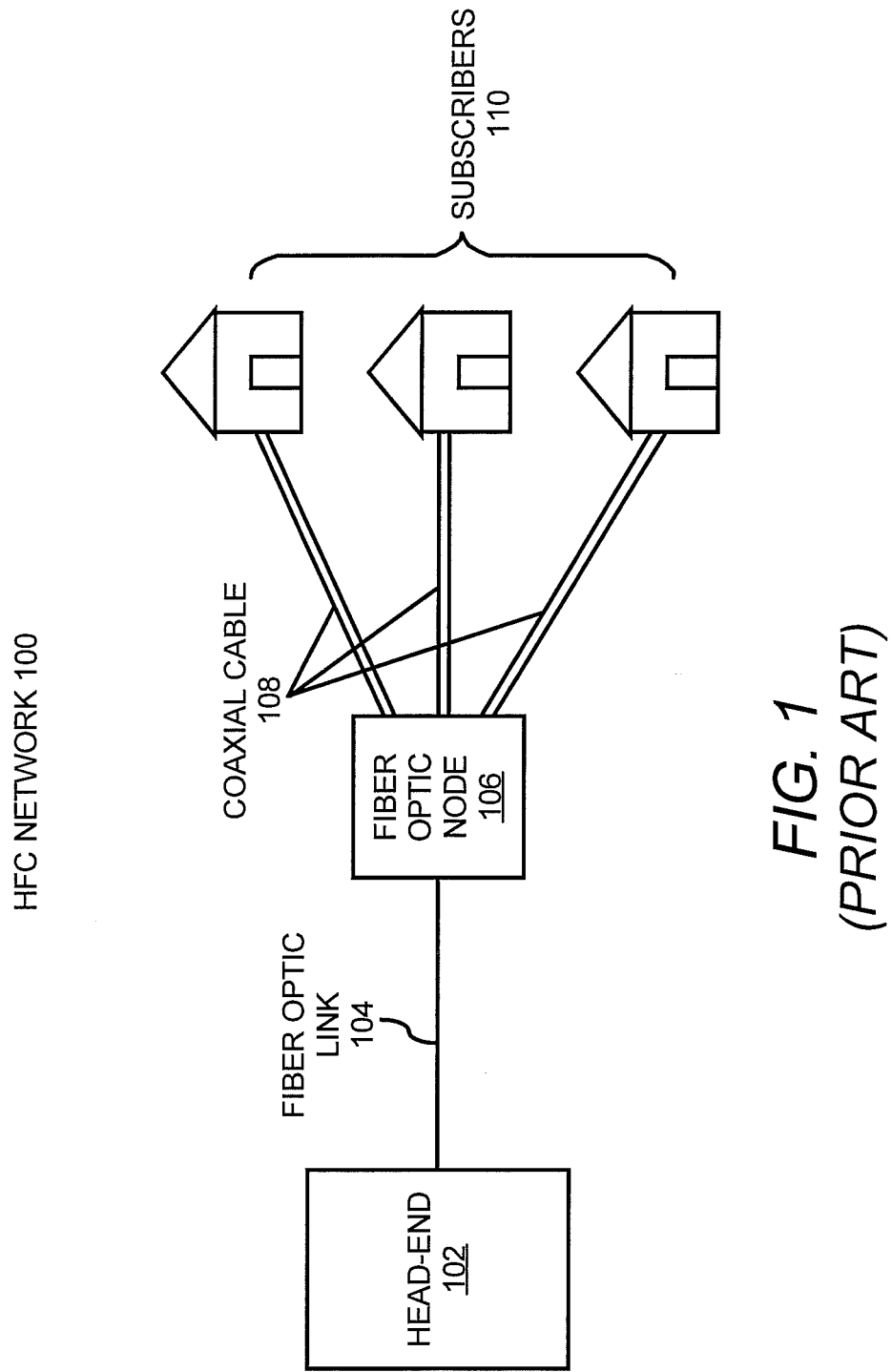
FIG. 1 illustrates a prior art HFC network.
Figure 2:
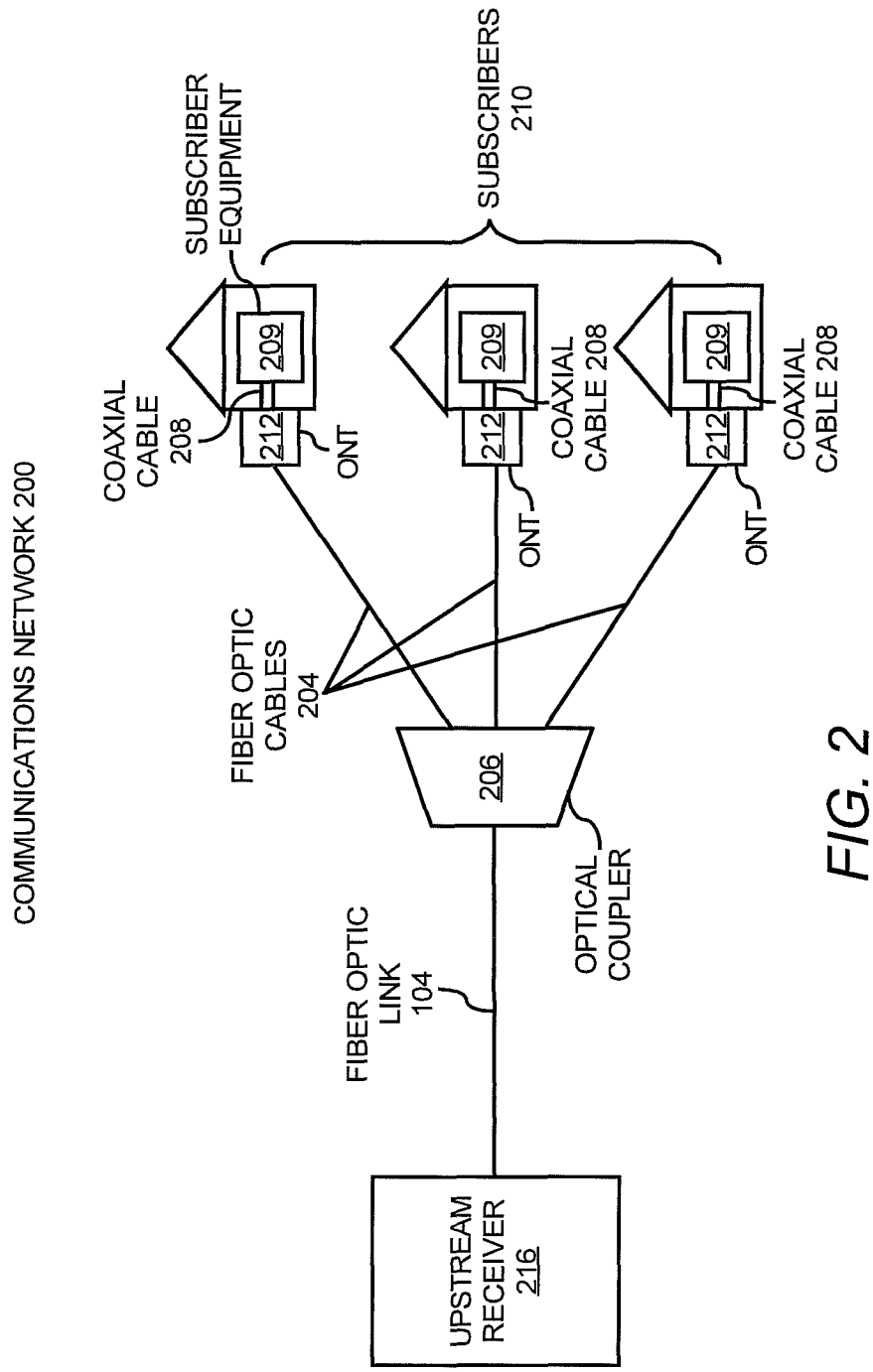
FIG. 2 illustrates a global diagram of the return path of an HFC network for transmitting a demodulated upstream signal, according to an embodiment.

FIG. 2 illustrates a communications network 200 having a return path, in accordance with an embodiment of the present invention. While FIG. 2 depicts an HFC network, a person having ordinary skill in the art will appreciate that the embodiments described herein are applicable to other communication networks, including cable systems where fiber is provided to the subscriber's premises or any DOCSIS-compliant network. The communications network 200 includes an upstream receiver 216 and a fiber optic link 104. The upstream receiver 216 may be any device for receiving an upstream transmission and may be similar to those used in a conventional HFC head-end 102, described above with respect to FIG. 1. The fiber optic link 104 connects to an optical coupler 206, which may be any multiplexer for receiving multiple inputs and combining these multiple inputs into a single output. The multiple inputs received by the optical coupler 206 originate from the subscribers 210 via fiber optic cables 204. Each subscriber 210 may include at least one piece of subscriber equipment 209 for generating a digital signal and converting the digital signal to a RF signal. For example, the subscriber equipment 209 may include DOCSIS compliant equipment located inside the subscriber's premises, such as a STB, cable modem, or MTA that is well known in the art. A person having ordinary skill in the art will appreciate that not every subscriber 110 may have subscriber equipment 209 for generating upstream signals.

The RF signal generated by the subscriber equipment 209 may be transmitted to an ONT 212 via coaxial cable 208. As set forth above, the ONT 212 may include any hardware and/or software for receiving a RF signal, demodulating the RF signal, and converting the demodulated signal into an optical transmission, as will be described in greater detail below. For example, the ONT 212 may be in the form of a utility box located on an outer wall of a premise of the subscriber, as depicted in FIG. 2. However, a person having ordinary skill in the art will appreciate that the physical location of the ONT 212 in relation to a subscriber is not critical and that the ONT 212 may be located on the interior of a subscriber, such as a home, or may be located any reasonably suitable distance outside of the subscriber's premises. Wherever its location, the ONT 212 and the subscriber equipment 209 may be connected via the coaxial cable 208, such that the RF signal generated by the subscriber equipment 209 may be transmitted from the subscriber equipment 209 to the ONT 212. After receiving the RF signal, the ONT 212 may select the upstream data signal from the composite RF spectrum, demodulate the upstream data signal into a baseband digital signal, and convert the baseband digital signal into an optical signal for transmission to the optical coupler 206 via the fiber optic cable link 204. Thus, instead of having to convert a modulated RF signal into an optical signal, the ONT 212 only has to convert the baseband digital signal that has been demodulated from the RF signal. This substantially reduces the bandwidth requirement for transmission of the upstream data signal back to the head-end.

While FIG. 2 depicts the optical coupler 206 receiving input signals from three ONT's 212, a person having ordinary skill in the art will appreciate that the optical coupler 206 is configurable to receive optical signals from any suitable number of ONT's 212. Moreover, the communications network 200 depicted in FIG. 2 shows the optical coupler 206 connected directly to the upstream receiver 216. However, a person having ordinary skill in the art will appreciate that the optical coupler 206 may be connected to any other components in, or external to, the head-end 102, which are capable of receiving optical signals. Alternatively, the communications network 200 may not include an optical coupler 206. Instead, each ONT 212 may be in connection with other devices or in direct connection with the upstream receiver 216.

Figure 3A:
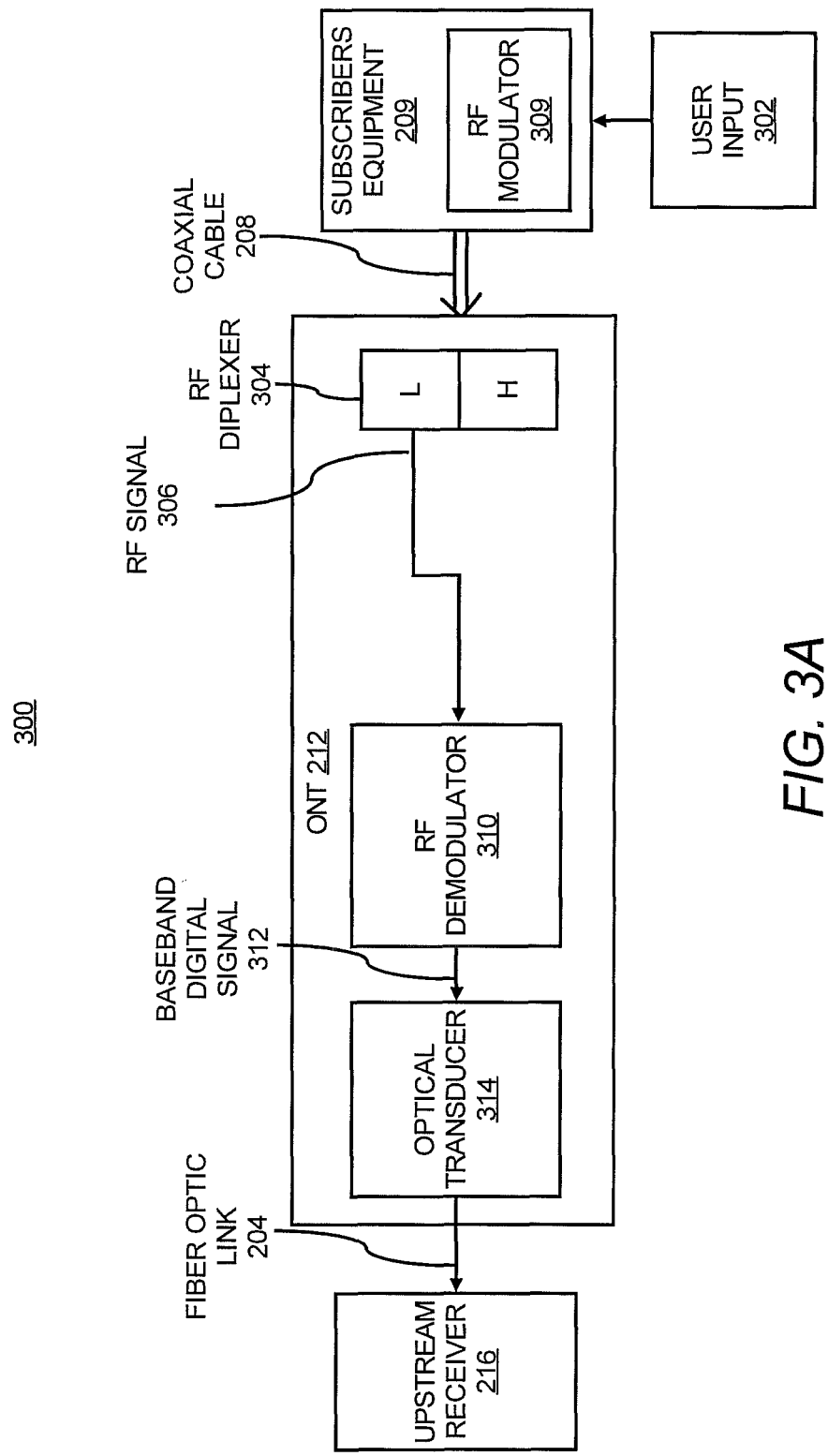
FIGS. 3A-B illustrate further details of the HFC network depicted in FIG. 2, according to various embodiments.
Figure 3B:
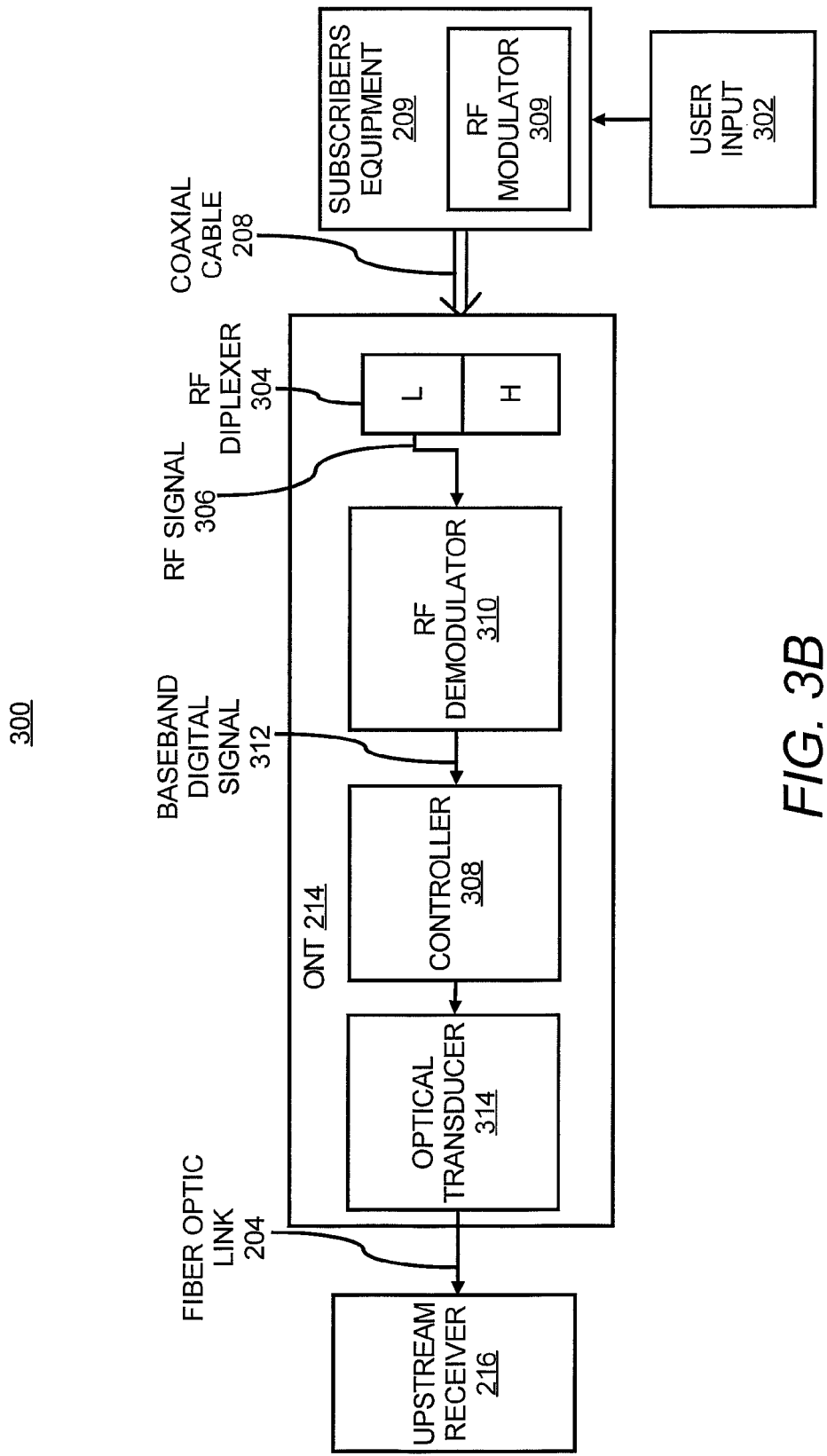

FIGS. 3A and 3B depict the same communications network 200 with more detailed illustrations of the ONT 212 and the subscriber equipment 209, in accordance with embodiments. With an upstream or return path of the communications network 200, data flow begins on the right side of the communications network 200. User input 302 is received at the subscriber equipment 209. As noted earlier, user input 302 may include the selection of a media program from an on-demand service, an email sent from a user's home computer, a VoIP phone call, etc. The user input 302 may be received by the subscriber equipment 209 in any suitable manner, such as by infra red (IR) beam from a user's remote control, or electrical signals generated from a keyboard, mouse, computer, Internet phone, or any other user interface of the subscriber equipment 209. The user input 302 may also include communications which occur automatically as a normal operating function of the subscriber equipment 209.

As set forth above, the subscriber equipment 209 may be any device for generating an upstream data signal. For example, with the user input 302, the subscriber equipment 209 may create a baseband digital signal. This baseband digital signal may be modulated and impressed upon an RF carrier signal by the RF modulator 309. Thus, the subscriber equipment 209 is operable to output the upstream data signal as an RF signal on one or more frequency bands or channels. For example, the upstream data signal is a baseband digital signal impressed on the 5-7 MHz frequency band. The RF modulator 309 may be any device known in the art, which is capable of modulating and impressing a digital signal onto an RF carrier signal for transmission. The subscriber equipment 209 may transmit the RF signal to the ONT 212 via the coaxial cable 208.

As depicted in FIG. 3A, in one embodiment, the ONT 212 includes an RF diplexer 304, an RF demodulator 310, and an optical transducer 314. The RF diplexer or combiner 304 may be any device for receiving, combining or separating, and re-routing RF signals. The RF diplexer 304 may separate and re-route the upstream and downstream signals in the communications network 200 based on their frequency. For example, low frequencies ranging from about 5 MHz to about 42 MHz, are generally designated for upstream signaling, while higher frequencies ranging from about 42 MHz to about 1000 MHz are designated for forward path, or downstream signaling. Therefore, the "L" and the "H" depicted in the RF diplexer 304 represent low and high frequency ranges for upstream and downstream signalings, respectively. Because the ONT 212 is operable to receiving both downstream signals from the head-end and upstream signals from the subscriber equipment 209, the RF diplexer 304 is operable to separate the low-frequency signals as upstream signals for output to the RF demodulator 310.

In the embodiment depicted in FIG. 3A, the communication protocols already inherent in the RF signals generated by the subscriber equipment 209 are used to assure proper timing. For example, any RF signals that share a single return or upstream channel in the communications network 200 are carried directly by the same scheme as described in the following scenario. If multiple pieces of subscriber equipment 209 exist in the same premises, such as the home, or where a single piece of subscriber equipment 209 generates multiple upstream signals, their signals may be controlled by an existing multiple-access protocol such as time division multiple access (TDMA) for modulation, which allow them to be demodulated by a single receiver at the subscriber's premises and then transmitted as a single bit stream on the fiber optic link 204. In this case, the single receiver is the ONT 212, with an RF demodulator 310 therein to facilitate the aforementioned demodulation.

When the RF upstream data signal is separated by the RF diplexer 304 and output to the RF demodulator 310, it is demodulated by the RF demodulator 310 into a baseband digital signal 312, which is the basic data or information sent by the subscriber equipment 209. The RF demodulator 310 may be any device for demodulating an RF signal to recover the original signal carried by the RF signal. The baseband digital signal 312 is then converted by the optical transducer 314 into an optical signal. The optical transducer 312 may be any device that is operable to convert a non-optical signal into an optical signal. For example, the optical transducer 312 may include a laser device, such as a laser diode, which is operable to convert the baseband digital signal 312 received from the RF demodulator 310 into an optical signal, which is then transmitted over the fiber optic link 204 to an upstream receiver 216. The optical transducer 312 is further described with reference to FIG. 4 below. The upstream receiver 216 may be any device for receiving and processing optical upstream signals. For example, the upstream receiver 216 may be a part of the head-end 102. As described above, the ONT 212 may or may not transmit the optical signal directly to the upstream receiver 316, because various components, such as multiplexers and optical couplers may be present in the upstream path between the upstream receiver 216 and the ONT 212.

FIG. 3B depicts another embodiment which allows for higher transmission rates at a single wavelength in the fiberoptic link 204. This embodiment is similar to the aforementioned embodiment in FIG. 3A. However, instead of modulating the optical transducer 314 in an ONT 214 at the home at the same rate as the multiple pieces of subscriber equipment 209 in the home that originate the signal transmissions, the modulation rate at the optical transducer 314 may be increased, for example, by some multiple. This allows the multiple signals generated from a single piece of subscriber equipment 209 or from several pieces of subscriber equipment in the same premise or in different premises to transmit at the same time at their individual lower rates, and then have those signals combined, for example, in a TDMA manner at the ONT 214 or combined optically at an optical coupler 206 shown in FIG. 2. Accordingly, in this embodiment, the ONT 214 at each subscriber 110 is similar to the ONT 212 in FIG. 3A, except that it further includes a controller 308, which may be hardware and/or software implemented so as to be operable to combine the various data streams from the RF demodulator 310 in a TDMA manner for input into the optical transducer 314 as described above with reference to FIG. 3A.

The controller 308 allows for the combining of multiple signals at different RF frequencies generated from a single subscriber 110 or multiple signals at different RF frequencies generated from multiple subscribers 110. All incoming signals may be buffered for a certain time period, regardless of their origin and RF frequency, and the controller 308 combines the demodulated data signals from the incoming signals for transmission at a higher rate (e.g., 100× a received rate) by the optical transducer 314. The controller 308 may determine when to transmit this high speed signal based on the RF frequency that the original signal arrived at. While the controller 308 is depicted in FIG. 3B as an independent component, a person having ordinary skill in the art will appreciate that the controller 308 may be an integral component of either the RF demodulator 310 or the optical transducer 314.

Accordingly, the aforementioned ONTs 212 and 214 allow upstream data signals, in essence, to be stripped to it's basic component, i.e., the baseband digital signal 312 as originally generated by the subscriber equipment 209. By transducing only the baseband digital signal 312, instead of its RF carrier signal, for optical transmission, the ONTs 212 and 214 prevent the transmission of the RF carrier signals over the fiber optic link 204, which would have required substantially more bandwidth for such a transmission and would require an external means for timing and control of the optical transmission. Thus, the ONTs 212 and 214 provide a more efficient and effective scheme for upstream signaling in the communications network 200. For example, an upstream data signal of tens of megabits may be transmitted instead of the typical 2-3 gigabytes required to conventionally transmit the entire upstream RF spectrum. Furthermore, because of the direct modulation of the baseband digital signals, the adherence of such signals to DOCSIS or similar protocols may continue to allow for proper distance ranging and RF power control and to hand such signals directly to the baseband interface in the CMTS at the head-end.

Figure 4:
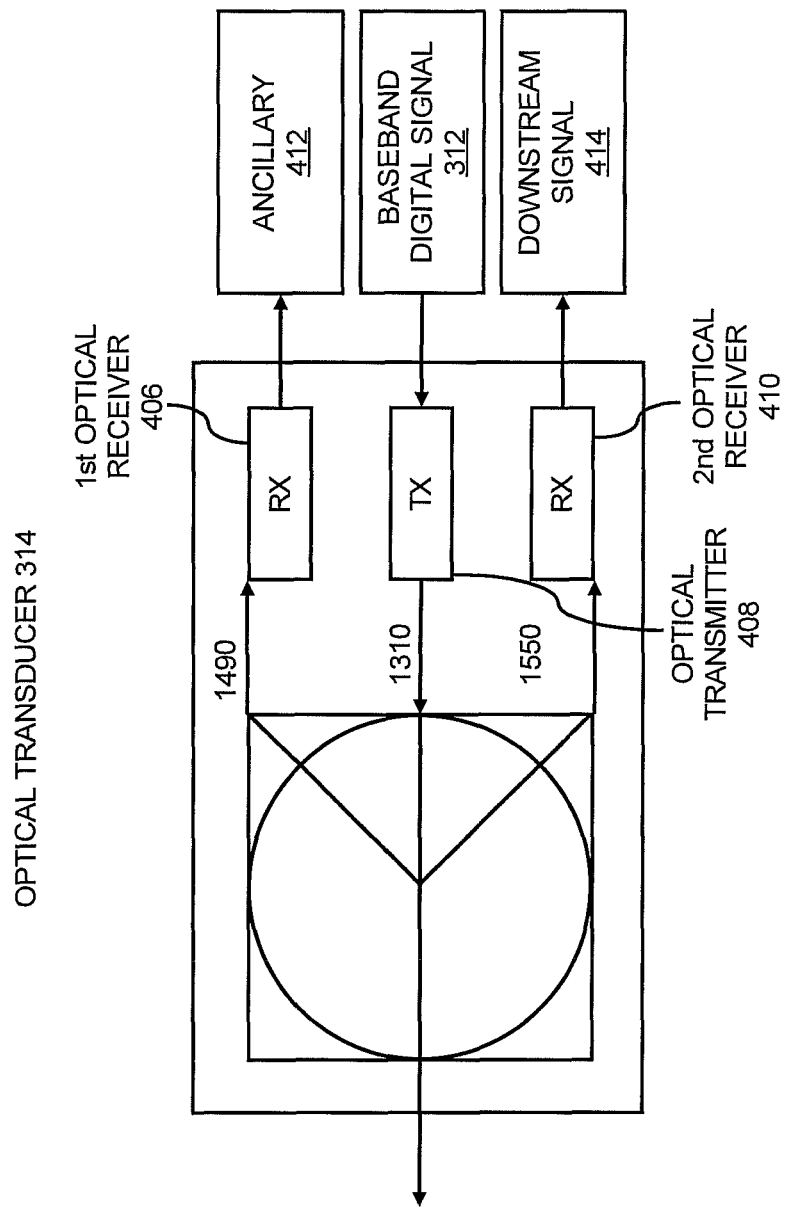
FIG. 4 illustrates an optical transducer, according to an embodiment.

FIG. 4 illustrates an optical transducer 314 for use in both the ONTs 212 or 214, in accordance with one embodiment of the present invention. The optical transducer 314 may be an optical multiplexer, such as an optical triplexer as illustrated in FIG. 4. The optical transducer 314 includes a first and second optical receiver 406 and 410, respectively, and an optical transmitter 408. The baseband digital signal 312 may be received from the RF demodulator 310 at the optical transmitter 408. The optical transmitter 408 (e.g., with a laser diode therein) is operable to convert the baseband digital signal 312 into an optical signal, which is then transmitted to the upstream receiver 216.

The optical transducer 314 may also receive optical signals that are sent from the head-end 102 for downstream signaling, for example, at the first and second optical receivers 406 and 410. The first optical receiver 406 may receive optical signals at one wavelength of light (e.g., 1490 nm wavelength) for downstream signaling at the ancillary 412. On the other hand, the optical transmitter 408 may transmit optical signals at a different wavelength of light (e.g., 1310 nm wavelength) for upstream signaling. The second optical receiver 410 also may receive optical signals, which may be additional downstream signals 414, at a wavelength different from that received by the first optical receiver 406 (e.g., 1550 nm wavelength). While the downstream signals 412 may be ancillary signals, the downstream signals 414 may include media content sent from the head-end to the subscribers 110, such as but not limited to television, movies, and Internet data, etc.

In both embodiments depicted in FIGS. 3A-B, the optical signals from the ONTs 212 and 214 at the subscriber's premises may be optically combined in an optical coupler, such as the optical coupler 206 depicted in FIG. 2, and may eventually end up at a collector node, hub, or similar device. Unlike the conventional combining of analog optical signals, the combined digital optical signals do not suffer from carrier-to-noise degradation or multiple optical carrier interference because only one laser or optical transducer 314 transmits at a time. Once the optical signals are combined and arrive at a collector node or hub, they may be sent further upstream. If signal levels are too low, they may be optically amplified or regenerated as desired.

Moreover, the various embodiments described herein provide an "open loop" upstream return path, because no new timing information is needed to transmit the upstream signals. That is, the timing and control information for the upstream signals is already present in the downstream DOCSIS signals. Thus, the embodiments described herein provide an efficient method for MSOs to utilize existing DOCSIS-compliant networks to enhance upstream signaling.

Figure 5A:
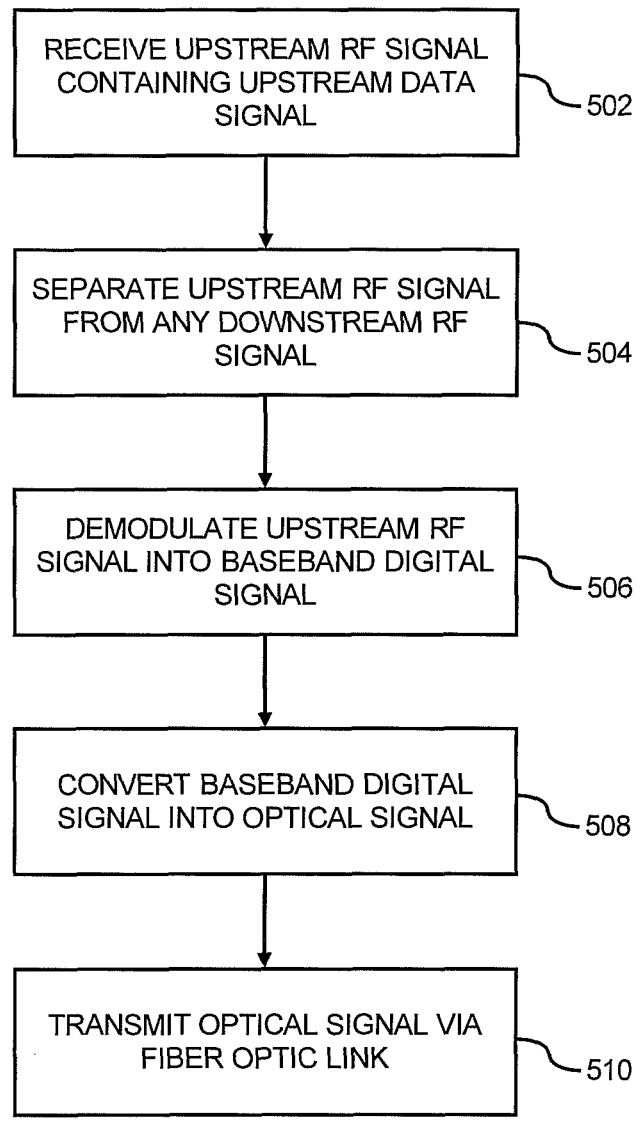
FIGS. 5A-B illustrate process flows for facilitating the transmission of an upstream data signal, according to various embodiments.
Figure 5B:
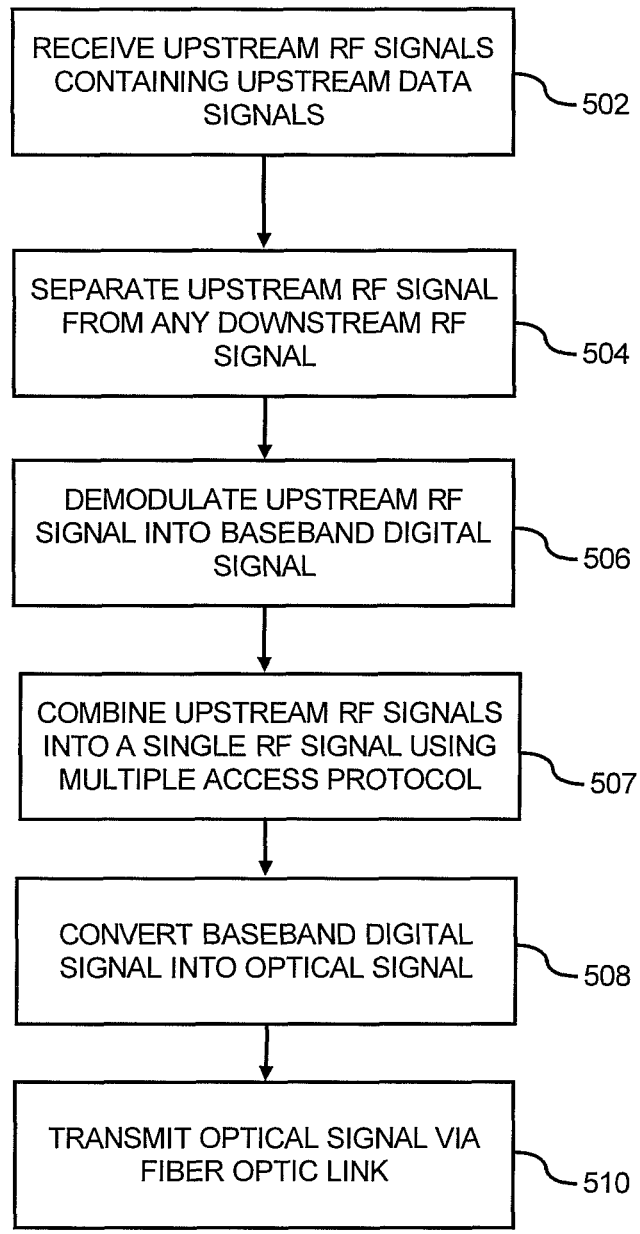

FIGS. 5A-B depicts a process flows or methods 500 and 550, respectively, for facilitating the transmission of an upstream data signal, in accordance with one embodiment of the present invention. The methods 500 and 550 are described with respect to FIGS. 2 and 3A-B by way of example and not limitation and it will be apparent that the methods 500 and 550 may be used in other HFC networks. Moreover, it is also apparent to a person having ordinary skill in the art that certain steps in the method 500 are optional and that an upstream data signal may be transmitted without practicing certain steps illustrated in FIGS. 5A-B. Similarly, additional steps may be inherent or added to the methods 500 and 550.

Referring to the method 500 in FIG. 5A, at 502, an upstream RF signal containing an upstream data signal is received by the ONT 212 at the diplexer 304. The upstream data signal may be in a particular frequency band or channel as defined by DOCSIS. The baseband digital signal may be generated by a subscriber equipment 209, which is then impressed on an RF carrier signal by the RF modulator 309 (FIG. 3A), which may be in response to the receipt of a user input 302 or may be automatically generated by the subscriber equipment 209 at the subscriber's premises.

At 504, the diplexer 304 separates the upstream RF signal from any downstream RF signal based on the frequencies of the two signals, as described earlier, so as to forward the upstream RF signal to the RF demodulator 310 and the downstream RF signal to the subscriber equipment 209.

At 506, the RF signal received from the diplexer 304 is demodulated into its original baseband digital signal.

At 508, the baseband digital signal is then converted into an optical signal. The optical signal may be generated by an optical transducer 314, having an optical transmitter 408.

At 510, the optical signal is transmitted by the optical transducer 314 via the fiber optic link 204 to an upstream receiver 216. The upstream receiver 216 may be located at the head-end 102 and may process the upstream data signal.

FIG. 5B depicts a method 550 that is similar to the method 500 in FIG. 5A, except with the addition of block 507 in between blocks 506 and 508, for combining baseband digital signals from multiple pieces of subscriber equipment 209. The multiple pieces of subscriber equipment 209 may be physically located at a single subscriber 110 or the multiple pieces of subscriber equipment 209 may be located at multiple subscribers 110. Thus, at 507, the controller 308 combines the various digital signals from the multiple pieces of subscriber equipment 209 in a TDMA manner, or in accordance with any other multiple access protocol, for input into the optical transducer 314. Thus, as described earlier, such signal combinations allow the optical transducer 314 to modulate signals at rates that are different from the rates of the various subscriber equipment 209 that provide input to each ONT 214. This allows the multiple pieces of subscriber equipment 209 to transmit at the same time at their individual lower rates, and then have those signals combined, for example, in a TDMA manner at the controller 308.

Accordingly, embodiments of the present invention provide effective and efficient schemes for the transmission of upstream or return-path signals, e.g., from the subscribers to the head-ends, in an HFC network. In these schemes, because no changes are made to the communication protocol of the actual information or data in the upstream signals, there continue to adhere to the same communication protocol, such as DOCSIS-compliant protocol, that is employed by the subscriber equipment that originates the upstream signals. Furthermore, the upstream signals are transmitted in de-modulated formats which substantially reduces the bandwidth requirement for their transmission. Consequently, the optical transmission equipment in the HFC network may be extended to the premise without significant increases in cost.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A method for facilitating a transmission of at least one upstream data signal from at least one subscriber in a communications network comprising:
   receiving upstream radio frequency (RF) signals simultaneously from multiple pieces of subscriber equipment for conversion into a single optical signal,
   wherein the RF signals share a single return to a receiver and wherein the multiple pieces of subscriber equipment transmit the RF signals at individual rates;
   demodulating at the receiver the multiple upstream RF signals into individual baseband digital signals using timing information inherent in the RF signals;
   combining the baseband digital signals for upstream transmission;
   converting, at a premises associated with the at least one subscriber, the combined baseband digital signals into a single optical signal for transmission at a second rate, wherein the second rate of the optical signal transmission is higher than the individual rates of the multiple pieces of subscriber equipment; and
   transmitting the single optical signal upstream via a fiber optic link in the communications network.

2. The method of claim 1, further comprising:
   receiving at least one downstream RF signal;
   separating the at least one upstream RF signal from the at least one downstream data signal;
   routing the at least one downstream RF signal to the at least one subscriber; and
   routing the upstream RF signals for demodulating.

3. A device for facilitating a transmission of upstream data signals from at least one subscriber in a communications network comprising:
   a radio frequency (RF) demodulator operable to:
   receive upstream radio frequency (RF) signals simultaneously from multiple pieces of subscriber equipment for conversion into a single optical signal, wherein the RF signals share a single return to the RF demodulator and wherein the multiple pieces of subscriber equipment transmit the RF signals at individual rates;

demodulate the multiple upstream RF signals into individual baseband digital signals using timing information inherent in the RF signals;

a controller operable to:

combine the baseband digital signals for upstream transmission, an optical transducer operable to:

convert the combined baseband digital signals into a single optical signal for transmission at a second rate, wherein the second rate of the optical signal transmission is higher than the individual rates of the multiple pieces of subscriber equipment, and transmit the single optical signal over a fiber optic link in the communications network at the second rate using a multiple-access protocol.

4. The device of claim 3, wherein the device is located at the subscriber's premises and the communications network is a hybrid fiber coaxial (HFC) network.

5. The device of claim 3, wherein the optical transducer includes an optical multiplexer.

6. The device of claim 5, wherein the optical multiplexer further comprises:

an optical receiver operable to receive downstream data signals.

7. The device of claim 3, wherein at least one of the RF signals is a baseband digital signal impressed on a RF carrier.

8. The device of claim 6, further comprising:

a RF diplexer operable to separate at least one of the RF signals that includes the at least one upstream signal from the downstream signals.

9. The device of claim 3, wherein the RF signals are each generated by a piece of subscriber equipment and wherein the device facilitates the transmission of signals from the subscriber equipment to the head-end terminal using a data over cable service interface specification (DOCSIS) protocol.

10. The device of claim 3, wherein the multiple-access protocol is a time division multiple access (TDMA) protocol.

11. The device of claim 3, wherein the upstream data signals are received from multiple pieces of subscriber equipment.

12. The device of claim 3, wherein the communications network is a hybrid fiber coax (HFC) network using a DOCSIS protocol.

13. The device of claim 12, wherein the optical transmission is sent to a cable head-end in the HFC network.

* * * * *